United States Patent [19]
Chiolle et al.

[11] Patent Number: 4,994,549
[45] Date of Patent: Feb. 19, 1991

[54] SEGMENTED THERMOPLASTIC COPOLYESTERS ENDOWED WITH ELASTOMERIC PROPERTIES

[75] Inventors: Antonio Chiolle; Gian P. Maltoni, both of Ferrara; Romolo Stella, St. Maria Maddalena, all of Italy

[73] Assignee: Ausimont S.R.L., Milan, Italy

[21] Appl. No.: 373,514

[22] Filed: Jun. 30, 1989

[30] Foreign Application Priority Data

Jul. 4, 1988 [IT] Italy ................................ 21212 A/88

[51] Int. Cl.$^5$ .............................................. C08G 63/02
[52] U.S. Cl. ...................................... 528/272; 528/285; 528/286; 528/287; 528/289; 528/299; 528/300; 528/304; 528/308.6
[58] Field of Search ............... 528/272, 285, 286, 287, 528/289, 299, 300, 304, 308.6

[56] References Cited

U.S. PATENT DOCUMENTS

| | | | |
|---|---|---|---|
| 3,023,192 | 2/1962 | Shivers, Jr. ........................ | 528/300 |
| 3,651,015 | 4/1969 | Ishida et al. ...................... | 528/223 |
| 3,891,604 | 6/1975 | Wolfe, Jr. ......................... | 528/272 |
| 3,959,062 | 5/1976 | Hoh et al. ......................... | 156/313 |
| 4,464,456 | 8/1984 | Fujikawa et al. .................. | 430/281 |

*Primary Examiner*—John Kight, III
*Assistant Examiner*—S. A. Acquah
*Attorney, Agent, or Firm*—Morgan & Finnegan

[57] ABSTRACT

Segmented thermoplastic copolyesters having elastomeric properties, containing from 25% to 80% by weight of short-chain polyester units derived from dicarboxylic acids and a diol, and from 20 to 70% by weight of long-chain polyester units derived from dicarboxylic acids and poly(alkylene oxide)-glycols in which at least 10% by weight of the poly-(alkylene oxide)-glycols has a molecular weight lower than 300, and a C/O ratio within the range of from 1.8 to 4.3.

16 Claims, No Drawings

SEGMENTED THERMOPLASTIC COPOLYESTERS ENDOWED WITH ELASTOMERIC PROPERTIES

DESCRIPTION OF THE INVENTION

The present invention relates to segmented thermoplastic copolyesters having elastomeric properties.

Based on the present state of the art, segmented thermoplastic copolyesters having elastomeric properties are known which consist of a multiplicity of repeating long-chain ester units and short-chain ester units connected to each other head-to-tail through linkages of the ester type, said long-chain ester units being represented by the formula:

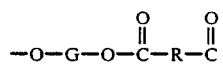  (I)

said short-chain units being represented by the formula:

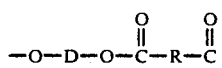  (II)

wherein: G is a divalent radical remaining after the removal of the end hydroxyl groups from a poly-(alkylene oxide)-glycols having a molecular weight within the range of from about 400 to 6000 and a carbon/oxygen ratio of about 2.0–4.3;

R is a divalent radical remaining after the removal of the carboxyl groups from a dicarboxylic acid having a molecular weight lower than about 300; and D is a divalent radical remaining after the removal of hydroxyl groups from a diol having a molecular weight lower than about 250 (see e.g., U.S. Pat. No. 3,023,192, U.S. Pat. No. 3,651,015, IT-A-947,589, ITA-963,304 and IT-A-973,059).

Such copolyesters, however, although displaying good hysical characteristics such as swelling resistance in non-polar liquids, good low-temperature mechanical properties, and so forth, turn out to be not particularly suitable for use in extrusion technology for the production of sheaths and uniform-thickness films, destined, e.g., for the protective coating of electrical cables, of electronic contacts, and so forth, wherein materials are required which have low melting temperatures and high mechanical properties (tensile strength and modulus), combined with a high resistance to tearing and to abrasion.

In accordance with the present invention it has, surprisingly, now been found that segmented thermoplastic copolyesters of the above type, which show higher values of hardness, density, tensile strength and tear resistance than the traditional copolyesters known from the prior art, as well as low melting points, such as make it possible for them to be used for sheaths for cables too, can be prepared when the long-chain segments are revived from a mixture of poly(alkylene oxide)-glycols containing at least 10% by weight of a poly-(alkylene oxide)glycol having a molecular weight lower than 300.

Furthermore, although they have lower melting points, such products also show a higher crystallization rate; a feature which, besides enabling materials not very resistant to temperature (PVC, PE, and so on) to be coated, makes it also possible for the sheaths to be extruded at a higher extrusion speed.

These products may be rendered flame-proof by suitable synergistic systems constituted by either organic or inorganic fillers and/or other substances, without their mechanical properties and their processing ability being decreased to any considerable extent.

Therefore, the subject-matter of the present invention are segmented, elastomeric, thermoplastic copolyesters essentially consisting of a multiplicity of repeating long-chain ester units and of short-chain ester units connected to each other head-to-tail through ester bonds, said long-chain ester units being represented by the formula:

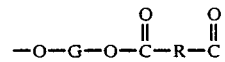  (I)

said short-chain units being represented by the formula:

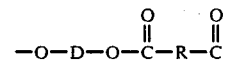  (II)

wherein

G is a divalent radical remaining after the removal of the end hydroxyl groups from a poly-(alkylene oxide)-glycol having a molecular weight not higher than 600%;

R is a divalent radical remaining after the removal of the carboxyl groups from a dicarboxy acid having a molecular weight lower than about 300; and D is a divalent radical remaining after the removal of hydroxyl groups from a diol having a molecular weight lower than about 250;

wherein:
G is constituted by a mixture of poly-(alkylene oxide)glycols containing at least 10% by weight of poly(alkylene oxide)-glycols having a molecular weight lower than, or equal to, 300;

The carbon/oxygen ratio in G is within the range of from 1.8 to 4.3; and the short-chain ester units are in an amount of about 25–80% by weight, and preferably 40–75% by weight, with respect to the weight of the polyester.

Another subject-matter of the present invention are the segmented copolyesters as defined above, containing from 15 to 45% by weight, relative to the end product, of a flame-proofing system based on aromatic halides, aliphatic halides, or of products not containing halogens.

A further subject-matter of the present invention is the use of such segmented copolyesters as specified above, either containing or not containing added flame-proofing systems based on aromatic halides, aliphatic halides or products not containing halogens, for the extrusion of sheaths, films and fibers.

Finally, a subject matter of the present invention are also flame-proof sheaths for low-voltage cables, totally or partially constituted by a segmented polyester to which a flame-proofing system, as defined above, is added.

The expression "long-chain ester chains," applied to units in a polymer chain, relates to the reaction product of a long-chain glycol with a dicarboxylic acid. Such "long-chain ester units," which constitute a repeating unit in the copolyesters according to the present invention, comply with the above formula (I).

The long-chain glycol according to the present invention may be totally constituted by poly-(alkylene oxide)-glycol having a molecular weight lower than 300, but it is possible to use as well a mixture of a poly-(alkylene oxide)-glycol having a molecular weight lower than 300 and a second poly-(alkylene oxide)-glycols having a molecular weight usually within the range of from 400 to 6000, in which the amount of the component having a molecular weight lower than 300 should be at least 10% by weight, and such that the ratio of carbon/oxygen is higher than, or equal to, 1.8.

When used alone, the poly-(alkylene oxide)-glycol preferably has a molecular weight of about 250. When a mixture of such compounds is used, a poly-(alkylene oxide) glycol having a molecular weight of about 250 is preferably used together with a poly-(alkylene oxide)-glycol having a molecular weight within the range of from about 650 to 1000, in proportions of from 1:9 to 9:1.

Such long-chain glycols, used to prepare the polymers according to the present invention, include the poly-(alk-ylene oxide)-glycols [wherein "alkylene" is a $(C_2-C_{10})$-alkylene], such as poly-(1,2- and -1,3-propylene oxide)-glycol, poly-(tetramethylene oxide)-glycol, poly(pentamethylene oxide)-glycol, poly-(hexamethylene oxide)glycol, poly-(heptamethylene oxide)-glycol, poly(octamethylene oxide)-glycol, poly-(nonamethylene oxide)glycol, poly-(decamethylene oxide), and poly-(1,2-butylene oxide)-glycol; random copolymers or block copolymers of ethylene oxide and 1,2-propylene oxide; polyformals prepared by reacting formaldehyde with such glycols as pentamethyleneglycol, or glycol mixtures, such as a mixture of tetramethyleneglycol and pentamethylene-glycol; the dicarboxymethyl-acids of polyalkylene oxides, such as those derived from poly(tetramethylene oxide), such as, e.g.:

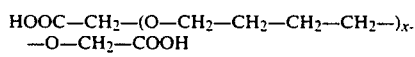

wherein x is small interior, or their esters. Furthermore, both poly-isoprene-glycol and poly-butadiene-glycol, their copolymers and saturated products obtained by means of their hydrogenation may be used as long-chain polymeric glycols. Additionally, the glycol-esters of dicarboxylic acids formed by the oxidation of polyisobutylene-diene copolymers may be used as raw materials.

In any case, poly-(tetramethylene oxide)-glycol is particularly preferred in the instant invention.

The expression "short-chain ester units", applied to units present in a polymeric chain, relates to the product of reaction of a diol having a low molecular weight (lower than about 250) with a dicarboxylic acid in order to form ester units represented by the formula (II) above reported.

Among the diols having a low molecular weight which react in order to form short-chain ester chains, non-cyclic, alicyclic and aromatic di-hydroxy compounds are included. Diols of from 2 to 15 carbon atoms such as ethylene-glycol, propylene-glycol, isobutylene-glycol, tetramethylene-glycol, pentamethylene-glycol, 2,2-dimethyl-trimethylene-glycol, hexamethyleneglycol and decamethylene glycol, di-hydroxycyclohexane, cyclohexane-dimethanol, resorcinol, hydroquinone, 1,5-di-hydroxy-naphthalene, and so forth, are preferred.

Particularly preferred are aliphatic diols containing from 2 to 8 carbon atoms. Di-hydroxyl-aromatic compounds which may be used are bisphenols, such as: bis-(p-hydroxy)-diphenyl, bis-(p-hydroxyphenyl)-methane, and bis-(p-hydroxyphenyl)-propane.

Also equivalent ester-forming derivatives of diols may be used as well (for example, ethylene oxide or ethylene carbonate may be used instead of ethylene glycol). The expression "low-molecular-weight diols" used in the present context should hence be understood as including all of the derivatives suitable for forming esters, on condition that the requisite relevant to the molecular weight is only referred with respect to the diol, and not to the derivatives thereof. However, 1,4-butane-diol is particularly preferred for the purpose of the present invention.

Dicarboxylic acids which are reacted with the above long-chain glycol and with the diols having a low molecular weight in order to produce the copolyesters according to the present invention are aliphatic, cycloaliphatic or aromatic dicarboxylic acids having a low molecular weight, i.e., having a molecular weight lower than about 300. The herein used expression "dicarboxylic acids" encompasses also equivalent derivatives of dicarboxylic acids which show a behavior substantially similar to that of the dicarboxylic acids in the reaction with glycol and diols for the formation of the copolyester polymers. These equivalent compounds include esters and ester-forming derivatives, such as, e.g., halides and anhydrides. The molecular weight requisite relates to the acid, and not to its ester equivalent, or to its derivatives suitable for forming esters.

Therefore, within the definition of "dicarboxylic acid" also an ester of a dicarboxylic acid having a molecular weight higher than 300, or an equivalent of a dicarboxylic acid having a molecular weight higher than 300 are included, on condition that the acid has a molecular weight lower than about 300. The dicarboxylic acids may contain any substituent group whatever, or any combination of substituent groups which do not interfere to a substantial extent with the formation of the copolyester polymer and with the use of the polymer in the end product according to the present invention.

Within the context of the present invention, by "aliphatic dicarboxylic acids" those carboxylic acids are meant that contain two carboxylic groups, with each of said carboxylic groups being bonded to a saturated carbon atom. If the carbon atoms to which the carboxylic group is bonded is a saturated one and is inside or part of a ring, the acid is cycloaliphatic. Often, the aliphatic acids or the cycloaliphatic acids containing an unsaturation of the conjugated type cannot be used, in that they are liable to homopolymerize. However, certain unsaturated acids, such as, e.g , moleic acids, may be used.

The "aromatic dicarboxylic acids," according to the expression used in the instant context, are those dicarboxylic acids which contain two carboxyl groups, with each carboxylic group being bonded to a carbon atoms in either an isolated or a condensed aromatic ring structure. It is not necessary that both of said functional carboxylic groups be bonded to a same aromatic ring, and, when more than one ring is present in the molecule, they then may be linked to each other by aliphatic or aromatic divalent radicals, such as, e.g., —O— or —SO$_2$—, or even by a simple bond.

Examples of aliphatic and cycloaliphatic acids which may be used according to the present invention are sebacic acid, 1,3-cyclohexane-dicarboxylic acid, 1,4-cyclohexanedicarboxylic acid, adipic acid, glutaric acid, succinic acid, oxalic acid, azelaio acid, diethyl-malonic acid, allylmalonic acid, 4-cyclohexene-1,2-dicarboxylic acid, 2-ethylsuberic acid, 2,2,3,3-tetamethyl-succinic acid, cyclopentanedicarboxylic acid, decahydro-1,5-naphthalene-dicarboxylic acid, 4,4'-dicyclohexyl-dicarboxylic acid, decahydro-2,6-naphthalene-dicarboxylic acid, 4,4'-methylene-bis(cyclohexyl)-carboxylic acid, 3,4-furane-dicarboxylic acid, 1,1-cyclobutane-dicarboxylic acid, and so forth. Cyclohexane-dicarboxylic acid and adipic acid are preferred dicarboxylic acids.

Examples of aromatic dicarboxylic acids which may be used are phthalic acid, isophthalic acid and terephthalic acid, dibenzic acid, dicarboxylic compounds substituted with two benzene rings, such as, e.g., bis-(para-carboxyl-phenyl)methyl, para-oxy-(para-carboxyl-phenyl)-benzoic acid, ethylene-bis-(para-oxy-benzoic acid), 1,5-naphthalenedicarboxylic acid, 2,6-naphthalene-dicarboxylic acid, 2,7-napthalene-dicarboxylic acid, phenanthrolene-dicarboxylic acid, anthralene-dicarboxylic acid, 4,4'-sulfonyl-dibenzoic acid and their (C$_1$–C$_{12}$)-alkyl derivatives and derivatives resulting from substitution on the ring, such as, e.g., halogenated derivatives, alkoxy derivatives, and aryl derivatives.

Aromatic acids containing a hydroxyl group, such as, e.g., para-($\beta$-hydroxyl-ethoxy)-benzoic acid, may also be used, on condition that an aromatic dicarboxylic acid is also present.

The aromatic dicarboxylic acids constitute a preferred class for the preparation of the copolyester polymers according to the present invention.

Among the aromatic acids, those which contain from 8 to 16 carbon atoms ar preferred: particularly preferred are phenylene-dicarboxylic acids, i.e., phthalic acid, isophthalic acid and terephthalic acid. In particular, either terephthalic acid alone or a mixture of terephthalic acid and isophthalic acid are preferred.

At least about 70% by mol of the dicarboxylic acid included in the polymer should preferably be constituted by terephthalic acid, i.e., about 70% of the "R" groups in the formulae (I) and (II) above, are preferably 1,4-phenylene radicals.

The carboxylic acids and their derivatives and the polymeric glycols are included in the end product in the same molar proportions in which they are contained in the reaction mixture The amount of low-molecular weight diol actually contained in the end product corresponds to the difference between the mols of diacid and the mols of polymeric glycol contained in the reaction mixture.

The copolyesters according to the present invention contain about 25–80% by weight of short-chain ester units corresponding to formula (II) above, with the residual portion being constituted by long-chain ester units corresponding to the above formula (I).

In these units, at least 10% of the poly-(alkylene oxide)-glycols should be constituted by poly-(alkylene oxide)-glycols having a molecular weight lower than 300. When the amount of such low-molecular-weight poly-(alkylene oxide)-glycols is lower than 10% by weight, the melting point of the copolyester which is obtained is not low enough to obtain a suitable product for the above reported applications (extrusions of sheaths, films, and so on).

The most preferred copolyesters for the purposes according to the present invention are those which are prepared from dimethyl terephthalate (DMT), 1,4-butanediol (BD), and a mixture of poly-tetramethylene-glycol (PTMG) having a molecular weight of about 1000 or of about 650, with at least 10% by weight (referred to the total amount of long-chain units) of PTMG having a molecular weight of about 250.

The polymers according to the present invention may be suitably prepared by means of a normal transesterification reaction. A preferred process consists or consists essentially in heating the dimethyl ester of terephthalic acid with as long-chain glycol and a molar excess of a butanediol in the presence of a catalyst at 150°–260° C., followed by the removal by distillation of the methanol formed by the exchange. The heating is continued until the removal of methanol is essentially complete. Depending on the temperature, on the catalyst, and on the excess of glycol, the polymerization turns out to be complete within the range of from a few minutes up to several hours.

This process makes it possible to prepare a low-molecular weight prepolymer which is then converted into a high-molecular-weight copolyester according to the present invention by means of the process described below. Such prepolymers may also be prepared by means of a certain number of processes of alternated esterification, or of mutual exchange of esters; e.g., the long-chain glycol may be reacted with a homopolymer or a copolymer of short-chain esters having a low molecular weight in the presence of a catalyst, until a randomization takes place.

The short-chain ester homopolymer or copolymer may also be prepared by means of a transesterification process both from dimethyl-esters and low-molecular-weight diols, and from the free acids with the diol-acetates.

In addition, the prepolymer may be prepared by carrying out this process in the presence of a long-chain glycol.

The molecular weight of the resulting prepolymer is then increased by distilling off the excess of the low-molecular-weight diol (polycondensation). During this distillation, a further transesterification occurs, which leads to an increase in molecular weight and to a random distribution of the various copolyester units in the molecule.

In order to avoid an excessively long dwell time of the polymer at a high temperature with the possibility of an irreversible thermal degradation, catalysts for the ester interchange reaction are employed. While a wide variety of catalysts may be used, the organic titanates, such as, e.g., titanium tetrabutylate, either alone or in combination with magnesium or calcium acetates, are preferred. Also complex titanates, such as Mg[HTi(OR)$_6$]$_2$, derived from alkali metal alkoides or alkaline-earth metal alkoxides and esters of titanic acid, are found to be efficacious. Inorganic titanates, such as lanthanum titanate, mixtures of calcium acetate and antimony dioxide, and lithium and magnesium alkoxides are further examples of catalysts which may be used.

The ester interchange polymerizations are generally carried out in the molten state, but inert solvents may also be used to facilitate the removal of volatile components from the mass at low temperatures.

Although the copolyesters according to the present invention display many advantageous characteristics, it is sometimes recommended to stabilize the end compositions toward heat or U.V. radiations. Such a stabilization is accomplished by introducing in the polyester compositions stabilizers such as phenols and their derivatives, amines and their derivatives, compounds containing both hydroxyl and amino groups, hydroxyazines, oximes, polymeric phenol esters, and salts of multivalent metals in which the metal is in its lowest valency state. Examples of phenolic derivatives which may be used as stabilizers include 4,4'-bis-(2,6-di.tert.butyl-phenol), 1,3,5-trimethyl-2,4,6-tris-[3,5-di-tert.butyl-4-hydroxybenzy]-benzene, and 4,4'-butylidene-bis-(6-te Typical stabilizers of the amine type include N,N'-bis-(β-naphthyl)-p-phenylene-diamine, N,N'-bis-(l-methylheptyl)-p-phenylene-diene, and phenyl-β-naphthyl-amine or its reaction products with aldehydes.

Substituted benzotriazoles and/or benzophenones are further examples of suitable U.V.-stabilizers.

The characteristics of the copolyesters according to the present invention may be further modified by the introduction of various conventional inorganic fillers, such as, e.g., carbon black, silica gel, alumina, clay, fiberglass, and so forth. In general, the effect of these additives is to increase the modulus of the material, but to the detriment of the elongation, of the tearing strength, and of the abrasion resistance.

Besides the above, the product may be rendered flameproof (UL 94 Class V2, V0, etc.) by the addition of various flame-proofing systems containing aromatic halides, or of new types of flame-proofing systems containing aliphatic halides or not containing halogens, in amounts ranging from 15 to 45% by weight, referred to the end product. The materials according to the present invention, to which the last two types of flame-proofing systems are added, have better flame behavior characteristics than those of the traditional segmented thermoplastic copolyesters, and are capable of passing the "Steiner 20 Foot Tunnel Test" as prescribed by UL 910, and may be given a rating of VO in the "vertical test" according to UL 94.

As conventional flame-proofing systems, there may be used decabromo-bisphenol A with $Sb_2O_3$ in the mutual ratio of 1.5:1, or new types of flame-proofing substances such as melamine hydrobromide see Italian patent application No. 20548 A/85) combined with $Sb_2O_3$ in the mutual ratio of 3:1, or, finally, synergistic systems not containing halogens, such as piperazine pyrophosphate combined with melamine phosphate, in a mutual ratio within the range of from 3:1 to 1 1 (Italian patent application Ser. No. 21,149 A/83).

As mentioned above, in case of the latter two flame-proofing systems products are obtained which show an optimum combination of characteristics in terms of:
speed of extrusion of the sheaths:
aesthetic appearance;
low smoke value;
flame-proofing level.

On the contrary, such flame-proofing systems turn out to be not very efficacious in case of conventional elastomeric copolyethers having a high melting point, because during their processing, these latter undergo a partial degradation.

In order to make the present invention still better understood, some examples are reported below which are of a merely illustrative character, and no way are limitative of the invention. Unless differently specified, all parts, proportions and parameters reported in the following are by weight.

EXAMPLE 1

A segmented copolyester according to the present invention was prepared as follows: to a 3equipped with a distillation column, variable-speed stirring means, a temperature control system, 613 g of dimethylterephthalate, 22 g of isophthalic acid, 244 g of 1,4-butenediol (excess: 0.3 mol), 263 g of PTMG 250, and 116 g of 650 were charged.

The temperature was gradually increased up to 140°–4 150° C. over about 1 hour, and 150 ppm of Ti(O-Bu)$_4$ previous dissolved in a few ml of butane diol (about 10–20 cm), was added).

After a short induction time, the reaction of transesterification started. This reaction was evidenced by an increase in column overhead temperature to about 65° C., which demonstrated the removal of methanol. The temperature of the reaction mass was gradually increased up to 205° C. (during a 2-hour time) and was kept constant at this value until the end of the methanol distillation.

150 ppm of catalyst (titanium tetrabutylate) and about 4000 ppm of stabilizer (Irganox® 1010) were added and vacuum was gradually applied until a residual pressure of about 0 05 mm$_{Hg}$ was reached (within a time of about 30 minutes), and heating was continued until an internal temperature of about 250° C. was reached. The end of reaction was determined by measurements of the load applied to the stirrer, which is proportional to the viscosity of the product, i.e., to the molecular weight reached. When the reaction was over, the polymer was discharged by extrusion onto a water-cooled conveyor belt, and was chopped into small cubic granules.

EXAMPLES 2–7

By operating in the same way disclosed above, but using different amounts of the various monomers, copolyesters having the inherent properties reported in Table 1 were prepared.

In Examples 2 and 4, PTMEG 250 was the only long-chain component, in Examples 3 and 5 (*Comparative Examples* all of the long-chain component had a molecular weight higher than 300 (PTMEG 1000).

TABLE 1

| | | | Examples | | | |
|---|---|---|---|---|---|---|
| Characteristics | Units | Analytical Method (ASTM) | 1 PTMG 650 28% PTMG 250 72% | 2 PTMG 250 100% | 3 PTMG 1000 100% | 4 PTMG 250 100% |
| Hardness (Shore D) | Points | D 2240 | 48 | 51 | 43 | 69 |
| Density | g/cm$^3$ | D 1505 | 1.226 | 1.226 | 1.154 | 1.252 |
| Melt Index | g/10 min | D 1238 | 17.5 | 17.8 | 18.0 | 10.9 |
| Melting Point | °C. | D 2117 | 160.5 | 162 | 192 | 184 |
| Under tensile conditions: | | | | | | |
| Yielding strength | MPa | D 638 | 20.0 | 23.0 | 20.0 | 31.6 |

TABLE 1-continued

| | | | | | | |
|---|---|---|---|---|---|---|
| Tensile strength | MPa | D 638 | 23 | 24.5 | 22.7 | 40.0 |
| Elongation at break | % | D 638 | 540 | 760 | 360 | 450 |
| Bending modulus | MPa | D 790 | 165 | 215 | 120 | 690 |
| Tearing B Method | N/mm | D 724 | 100 | 110 | 92 | 173 |
| Abrasion H 18 (Taber 1 kg) | mg/kcycles | D 1044 | 53 | 64 | 85 | 47 |
| IZOD Resilence with notch at: | | | | | | |
| +23° C. | J/m | D 256 | NR | NR | NR | 150 |
| 0° C. | J/m | D 256 | NR | 950 | NR | 46 |
| −10° C. | J/m | D 256 | NR | 1090 | NR | 40 |
| −20° C. | J/m | D 256 | NR | 110 | NR | 40 |
| −30° C. | J/m | D 256 | NR | 75 | NR | 35 |
| HDT 455 Pa | °C. | D 648 | 58 | 74 | 64 | 92 |
| VICAT 1 kg | °C. | D 1525 | 140 | 136 | 150 | 182 |
| Water content (24 hours at 23° C.) | % | D 570 | 0.79 | 0.30 | 0.7 | 0.15 |

| | | | Examples | | |
|---|---|---|---|---|---|
| Characteristics | Units | Analytical Method (ASTM) | 5 PTMG 1000 100% | 6 PTMG 650 56% PTMG 250 44% | 7 PTMG 1000 57% PTMG 250 44% |
| Hardness (Shore D) | Points | D 2240 | 59 | 68 | 67 |
| Density | g/cm³ | D 1505 | 1.24 | 1.260 | 1.255 |
| Melt Index | g/10 min | D 1238 | 11.0 | 16.6 | 9.1 |
| Melting Point | °C. | D 2117 | 215 | 197 | 195 |
| Under tensile conditions: | | | | | |
| Yielding strength | MPa | D 638 | 34.0 | 28.0 | 27.5 |
| Tensile strength | MPa | D 638 | 35.4 | 39.5 | 38.5 |
| Elongation at break | % | D 638 | 600 | 600 | 580 |
| Bending modulus | MPa | D 790 | 360 | 489 | 461 |
| Tearing B Method | N/mm | D 724 | 180 | 197 | 195 |
| Abrasion H 18 (Taber 1 kg) | mg/kcycles | D 1044 | 65 | 42 | 45 |
| IZOD Resilence with notch at: | | | | | |
| +23° C. | J/m | D 256 | 300 | 215 | 860 |
| 0° C. | J/m | D 256 | 250 | 50 | 120 |
| −10° C. | J/m | D 256 | 200 | 50 | 100 |
| −20° C. | J/m | D 256 | 190 | 39 | 90 |
| −30° C. | J/m | D 256 | 90 | 28 | 70 |
| HDT 455 Pa | °C. | D 648 | 123 | 125 | 121 |
| VICAT 1 kg | °C. | D 1525 | 205 | 134* | 148* |
| Water content (24 hours at 23° C.) | % | D 570 | 0.30 | 0.13 | 0.16 |

*VICAT 5 kg

EXAMPLES 8 and 9

Examples 8 and 9 relate to the preparation of flame-proofing formulations: a master batch (MBOISE) was prepared as follows: 50 kg of polymeric powder forms having the same compositions as in Examples 6 and 7 was mixed in a turbomixer with 50 kg of a mixture in powder form of $Sb_2O_3$ and decabromo-bisphenol A in a ratio of 1:1.5 by weight.

Such powder was then extruded in a twin-screw extruder at a temperature within the range of from 180° to 200° C. The so-obtained granules were dried and used as the master batch (in the amount of 15% by weight) for the preparation of the flame-proof formulations of Examples 8 and 9, the mechanical characteristics and flame-proofing properties of which are reported below in Table 2.

EXAMPLE 10

By operating according to the same way as for the master batch of Examples 8 and 9, a formulation was prepared by using the matrix of Example 1 and the flame-proofing system of Examples 8 and 9. The mechanical characteristics and the results of flame behavior are reported below in Table 3.

TABLE 2

| | | | Examples | |
|---|---|---|---|---|
| Characteristics | Units | Analytical Method (ASTM) | 8 PTMG 650 56% PTMG 250 44% | 9 PTMG 1000 57% PTMG 250 43% 15% |
| Hardness (Shore D) | Points | D 2240 | 65 | 64 |
| Density | g/cm³ | D 1505 | 1.292 | 1.296 |
| Melt Index | g/10 min | D 1238 | 31 | 37 |
| Melt Point | °C. | D 2117 | 190 | 186 |
| Under tensile conditions: | | | | |
| Yielding strength | MPa | D 638 | 25 | 25 |
| Tensile strength | MPa | D 638 | 23 | 26 |
| Elongation at break | % | D 638 | 460 | 475 |
| Bending modulus | MPa | D 790 | 417 | 383 |
| IZOD Resilience with notch: | | | | |
| at 23° C. | J/m | D 256 | 113 | 107 |
| at 0° C. | J/m | D 256 | 30 | 30 |

TABLE 2-continued

| Characteristics | Units | Analytical Method (ASTM) | Examples 8 PTMG 650 56% PTMG 250 44% | 9 PTMG 1000 57% PTMG 250 43% 15% |
|---|---|---|---|---|
| HDT 445 Pa | °C. | D 648 | 121 | 117 |
| Water content (24 hours at 23° C.) | % | D 570 | 0.16 | 0.16 |
| Ashes (3 hours at 650° C.) | % | D 817 | 0.63 | 0.49 |
| $O_2$ Index | % | D 2863 | 28 | 28 |
| UL 94 | | D 2863 | V2 | V2 |
| Density of smoke. NBS Chamber | | | | |
| $D_{max}$ (7 minutes) | °/oo | D 2843 | 165 | 165 |
| $D_{90}$ (7 minutes) | °/oo | D 2843 | 130 | 130 |

EXAMPLE 11

By using the same matrix as in Example 1 and operating according to the same way as in Example 10, 6 kg of melamine hydrobromide, 2 kg of $Sb_2O_3$, and 0.5 g of Interox ® (a free radical promoter peroxide) were mixed. The mechanical characteristics and the results of flame behavior are reported below in Table 3.

EXAMPLE 12

By using the same matrix as in Example 1 and operating in the same way as in Example 10, 27 kg of piperazine phosphate (PAP), 8 kg of melamine phosphate (MP), 0.5% by weight of $TiO_2$ relative to the total amount of the components, and 0.5% by weight of Irganox ®, relative to the total amount of the components, very finely ground (size of the particles of the order of microns) were mixed. The mechanical characteristics and the results of flame behavior are reported below in Table 3.

TABLE 3

| Characteristics | Units | Analytical Method (ASTM) | Examples 10 | 11 | 12 |
|---|---|---|---|---|---|
| Hardness (Shore D) | Points | D 2240 | 49 | 50 | 57 |
| Density | g/cm³ | D 1238 | 1.226 | 1.25 | 1.351 |
| Tensile strength (under traction) | MPa | D 638 | 17.5 | 15.9 | 12 |
| Elongation at break | % | D 638 | 630 | 550 | 267 |
| Bending modulus | MPa | D 790 | 150 | 197 | 346 |
| Ash content (3 hrs. at 650° C.) | % | D 817 | 0.98 | 1.01 | — |
| Flame Behavior | | | | | |
| $O_2$ Index | % | D 2863 | 29 | 29 | 40 |
| UL 94 | — | D 2863 | V2 | V2 | V0 |
| Smoke Density (7 minutes) | | | | | |
| $D_{max}$ (NBS Chamber) | °/oo | D 2863 | 170 | 160 | 145 |
| $D_{90}$ (NBS Chamber) | °/oo | D 2863 | 139 | 35 | 110 |

EXAMPLE 13, 14, 15

Using the products of Examples 10, 11, 12, sheaths of 3 mm of diameter coating 4 pairs of wires were manufactured. Said sheaths were subjected to the "Steiner 20 Foot Tunnel Test" (UL 910).

the results shown below in Table 4 indicate that the products according to the present invention formulated with the flame-proofing systems according to Italian patent applications Nos. 20,548 A/85 and 21,149 A/83 show a better performance than the conventional products.

For comparative purposes, the product described in Example 16 (Comparative Example was used.

EXAMPLE 16 (COMPARATIVE EXAMPLE)

Following the same procedure as in Example 1, 486 of dimethyl terephthalate, 234 g of 1.4-butanediol (excess 0.3 mol), and 510 g of PTMG 1000 were charged to a 3-liter autoclave equipped with a distillation column, a variable-speed stirring means, and a temperature-control system.

The temperature was gradually increased up to 140°-150° C. over a time of about 1 hour, and 150 ppm of $Ti(OBu)_4$ previously dissolved in a few ml of butanediol (about 10-20 cm³) was added. After a short induction time, the transesterification reaction started. This reaction was evidenced by an increase in column overhead temperature to about 65° C., which demonstrated that methanol was removed. The temperature of the reaction mass was gradually increased up to 205° C. (during a 2-hour time) and was kept constant at this value until the end of the distillation methanol.

150 ppm of catalyst (titanium tetrabutoxide) and about 4000 ppm of stabilizer (Irganox ® 1010) were added and vacuum was gradually applied until a residual pressure of about 0.05 mm$_{Hg}$ was reached [within about 30 minutes), and heating was continued until an internal temperature of about 250° C. was reached. The end of reaction was determined by measurements of the load applied to the stirrer, which was proportional to the viscosity of the product, i.e., to the 4 molecular weight reached. When the reaction was over, the polymer was discharged by extrusion onto a water-cooled conveyor belt, and was chopped into granules.

The product obtained was rendered flame-proof by means of a conventional system consisting of decabromobisphenol A+$Sb_2O_3$ in the same proportions, and according to the same procedures as in Example 10, and was then used in order to prepare a sheath (of 3 mm of diameter) coating 4 pairs of wires. Said sheath was subsequently subjected to the "Steiner 20 Foot Tunnel Test" according to UL 910 Standard. The results are reported below in Table 4.

TABLE 4

| Example | Flame Spread (feet) | Average Smoke (optical density %) | Drip* |
|---|---|---|---|
| 13 | 5.5 | 0.177 | 4 |
| 14 | 4.5 | 0.150 | 7 |
| 15 | 4.5 | 0.107 | 2 |
| 16 | 6.0 | 0.181 | 10 |

The maximum accepted reference levels are:

TABLE 4-continued

| Example | Flame Spread (feet) | Average Smoke (optical density %) | Drip* |
|---|---|---|---|
| | <5 | <0.150 | <10 |

*0 = does not drip
10 = releases a large amount of drops, which anyway burn out.

The mechanical properties of the sheaths of Examples from 13 to 16 are summarized below in Table 5.

TABLE 5

| Examples | Tensile strength MPa | Elongation at break % | (160 hrs. at 20° C.) Tensile strength MPa | Elongation at break % |
|---|---|---|---|---|
| 13 | 19.5 | 400 | 18.6 | 360 |
| 14 | 12.5 | 680 | 11.8 | 600 |
| 15 | 23.6 | 680 | 20.8 | 470 |
| 16 | 18.0 | 900 | 10.0 | 12 |

As one can see from Table 5, the products according to the present invention show a higher thermal stability, under air aging conditions, than the traditional flameproof Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. Segmented, elastomeric thermoplastic copolyesters essentially consisting of a multiplicity of repeating long-chain ester units and short-chain ester units connected to each other head-to-tail through linkages of the ester type, said long-chain ester units being represented by the formula:

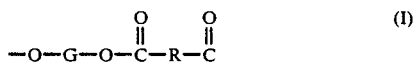

said short-chain units being represented by the formula:

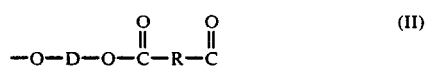

wherein:
G is a divalent radical remaining after the removal of the end hydroxyl groups from a poly-(alkylene oxide)-glycol having a molecular weight not higher than about 6000;
R is a divalent radical remaining after the removal of the carboxyl groups from a dicarboxylic acid having a molecular weight lower than about 30%; and
D is a divalent radical remaining after the removal of hydroxyl groups from a diol having a molecular weight lower than about 250; characterized in that:
G is a mixture of poly-(alkylene oxide)-glycols containing at least 10% by weight of poly-(alkylene oxide)-glycols having a molecular weight lower than, or equal to, 300;
the carbon/oxygen ratio in G is within the range of from 1.8 to 4.3; and
the short-chain ester units are in an amount of about 25-80% by weight relative to the weight of the polyesters whereby improved melt flow, tearing IZOD resilience or heat resistance are obtained compared to individual glycols.

2. Segmented copolyester according to claim 1, wherein "G" is totally constituted by a poly(alkylene oxide)-glycol having a molecular weight lower than 300.

3. Segmented copolyester according to claim 2, wherein that the poly-(alkylene oxide)-glycol has a molecular weight lower than about 250.

4. Segmented copolyester according to claim 1, wherein the poly-(alkylene oxide)-glycol is a mixture of a poly-(alkylene oxide)-glycol having a molecular weight within the range of from about 650 to 1000, and of a poly-(alkylene oxide)-glycol having a molecular weight lower than 300, in the proportions within the range of from 9:1 to 1:9.

5. Segmented copolyester according to claim 1, wherein the poly-(alkylene oxide)-glycol is a mixture of poly-(alkylene oxide)-glycol having a molecular weight about 650 or about 1000, and a poly-(alkylene oxide)-glycol having a molecular weight of about 250, in the proportions of from 1:9 to 9:1.

6. Segmented copolyester according to any one of claims 1 to 5, wherein the poly-(alkylene oxide)-glycol is poly-(tetramethylene oxide)-glycol.

7. Segmented copolyester according to one of claims 1 to 5, wherein the dicarboxy acid is terephthalic acid.

8. Segmented copolyester according to any one of claims 1 to 5, wherein the dicarboxy acid is a mixture of terephthalic acid and isophthalic acid containing at least 70% by mol of terephthalic acid.

9. Segmented copolyester according to any one of claims 1 to 5, wherein the diol having a molecular weight lower than 250 is 1,4-butanediol.

10. Segmented copolyester according to any one of claims 1 to 5, wherein the short-chain ester units constitute about 55-75% by weight of the polymer.

11. Segmented copolyester according to any one of claims 1 to 5, consisting essentially of from 15 to 45% by weight, relative to the end product, of a flame-proofing system based on aromatic halides, aliphatic halides, or products not containing halogens.

12. Segmented copolyester according to claim 11, wherein the flame-proofing system based on aromatic hydrocarbons consists of a mixture of decabromobisphenol A and $Sb_2O_3$ in a mutual ratio of 1.5:1.

13. Segmented copolyester according to claim 11, wherein the flame-proof system based on aliphatic halides consists of a mixture of melamine hydrobromide and $Sb_2O_3$ in a ratio of 3:1.

14. Segmented copolyester according to claim 11, wherein the flame-proofing system not containing halogens consists of a mixture of piperazine pyrophosphate and melamine phosphate in a ratio within the range of from 3:1 to 1:1.

15. The extrusion of sheaths, films and fibers in the presence of a segmented copolyester according to any one of claims 1 to 5.

16. Low-density flame-proofing sheaths for cables totally or partially constituted by a segmented copolyester according to any one of claims 1 to 5.

* * * * *